US008536989B2

(12) United States Patent
Sabo et al.

(10) Patent No.: US 8,536,989 B2
(45) Date of Patent: Sep. 17, 2013

(54) METHOD AND APPARATUS FOR PROVIDING A COMMUNICATION LINK

(75) Inventors: James Paul Sabo, Pasadena, CA (US); Joseph Dee Hart, Simi Valley, CA (US); Chester Talbot Hartwell, Saugerties, NY (US)

(73) Assignee: Thomson Licensing, Boulogne-Billancourt (FR)

( * ) Notice: Subject to any disclaimer, the term of this patent is extended or adjusted under 35 U.S.C. 154(b) by 846 days.

(21) Appl. No.: 12/449,786

(22) PCT Filed: Jun. 27, 2007

(86) PCT No.: PCT/US2007/015117
§ 371 (c)(1),
(2), (4) Date: Aug. 26, 2009

(87) PCT Pub. No.: WO2008/105795
PCT Pub. Date: Sep. 4, 2008

(65) Prior Publication Data
US 2010/0013607 A1   Jan. 21, 2010

Related U.S. Application Data

(60) Provisional application No. 60/903,470, filed on Feb. 26, 2007.

(51) Int. Cl.
*G07C 11/00* (2006.01)
(52) U.S. Cl.
USPC .................. 340/286.06; 340/286.02; 714/46; 379/93.01

(58) Field of Classification Search
USPC .. 340/286.06; 370/352; 714/46; 379/93.17, 379/265.09; 709/203, 217, 219
See application file for complete search history.

(56) References Cited

U.S. PATENT DOCUMENTS

| | | | |
|---|---|---|---|
| 6,397,187 B1* | 5/2002 | Vriens et al. .................. | 704/275 |
| 6,985,589 B2 | 1/2006 | Morley et al. | |
| 7,236,835 B2 | 6/2007 | Tanimoto | |
| 7,260,597 B1* | 8/2007 | Hofrichter et al. ............ | 709/200 |
| 2003/0059009 A1* | 3/2003 | Meyerson et al. ......... | 379/93.17 |
| 2003/0179729 A1 | 9/2003 | MacLeod Beck et al. | |

(Continued)

FOREIGN PATENT DOCUMENTS

| | | |
|---|---|---|
| JP | 2006311418 | 11/2006 |
| JP | 2006332891 | 12/2006 |
| WO | WO9749030 | 12/1997 |

OTHER PUBLICATIONS

Viking, "Technical Practice, K-1500-E and K-1500-EHF, Emergency/Elevator Phones," Feb. 2, 1999, 2 pages.

(Continued)

*Primary Examiner* — Kerri McNally
(74) *Attorney, Agent, or Firm* — Robert D. Shedd

(57) ABSTRACT

A method provides a communication link between a first location such as a digital cinema theater and a second location such as a support station. According to one exemplary embodiment, the method includes the steps of initiating a communication link between a first location and a second location in response to an activation by a user, automatically providing an identification associated with the first location to the second location via the communication link and wherein the identification enables the second location to obtain information relating to an undesirable operating condition of the first location.

26 Claims, 3 Drawing Sheets

(56) References Cited

U.S. PATENT DOCUMENTS

| | | |
|---|---|---|
| 2004/0240627 A1 | 12/2004 | Nakajima |
| 2004/0252280 A1* | 12/2004 | Paige et al. ............... 352/41 |
| 2006/0020690 A1* | 1/2006 | Richards et al. ............ 709/221 |
| 2006/0072549 A1 | 4/2006 | Goldman et al. |
| 2007/0005157 A1 | 1/2007 | Tanimoto |

OTHER PUBLICATIONS

International Search Report, Jan. 2, 2008. (only part of International search report is submitted with this application, that part contains a list of cited references and two dates shown at the bottom of the page: Dec. 19, 2007 is the date of completing the search report and Jan. 2, 2008 is the date of mailing the search report.

* cited by examiner

METHOD AND APPARATUS FOR PROVIDING A COMMUNICATION LINK

This application claims the benefit, under 35 U.S.C. § 365 of International Application PCT/US2007/015117, filed Jun. 27, 2007, which was published in accordance with PCT Article 21(2) on Sep. 4, 2008 in English and which claims the benefit of United States provisional patent application No. 60/903,470, filed Feb. 26, 2007.

The present invention generally relates to a method and apparatus for providing a communication link between a first location such as a digital cinema theater and a second location such as a support station.

The need for a communication link between different locations may arise in many different situations. For example, in the course of presentation of digital cinema content at a theater, a need may arise for the projectionist to contact a support center in the event of a problem. Presently, the projectionist establishes a communication link via a land line or cell phone. This approach suffers the disadvantage that the projectionist must know the number of the support center or look it up, wasting valuable time in the event of an outage.

Further, most of the interaction with the support station involves questions about or actions to be performed upon the projection booth. In a majority of projection booths, no land line phone is available by the choice of the exhibitor. Further, cell phones are both expensive to operate and prone to dropping calls due to the amount of metal, concrete, and electrical interference commonly found in projection booths.

A further complication of such calls is determining exactly which equipment is involved. This requires specific identification of the theatre, auditorium, and device(s), often by serial number, involved in the presentation.

Accordingly, there is need for a method and apparatus capable of addressing the foregoing problems and for providing a communication link between a first location such as a digital cinema theater and a second location such as a support station. The present invention addresses these and/or other issues.

In accordance with an aspect of the present invention, a method for providing a communication link between a first location such as a digital cinema theatre and a second location such as a support station is disclosed. According to an exemplary embodiment, the method comprises the steps of initiating the communication link between the first location and the second location in response to an activation by a user, automatically providing an identification associated with the first location to the second location via the communication link, and wherein the identification enables the second location to obtain information relating to an undesirable operating condition of the first location.

In accordance with another aspect of the present invention, an apparatus such as a call box is disclosed. According to an exemplary embodiment, the apparatus comprises means such as an interface for initiating a communication link between a first location and a second location in response to an activation by a user, and means such as a controller for automatically providing an identification associated with the first location to the second location via the communication link. The identification enables the second location to obtain information relating to an undesirable operating condition of the first location.

In accordance with still another aspect of the present invention, another method for providing a communication link between a first location such as a digital cinema theatre and a second location such as a support station is disclosed. According to an exemplary embodiment, the method comprises the steps of providing a communication link between the first location and the second location in response to an activation by a user at the first location, automatically receiving an identification associated with the first location at the second location via the communication link, and using the identification at the second location to obtain information relating to an undesirable operating condition of the first location.

In accordance with yet another aspect of the present invention, an apparatus such as call center is disclosed. According to an exemplary embodiment, the apparatus comprises means such as an interface for providing a communication link between a first location and a second location in response to an activation by a user at the first location, and means such as a support station for automatically receiving an identification associated with the first location at the second location via the communication link. The identification enables the receiving means to obtain information relating to an undesirable operating condition of the first location.

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

Figure 1:
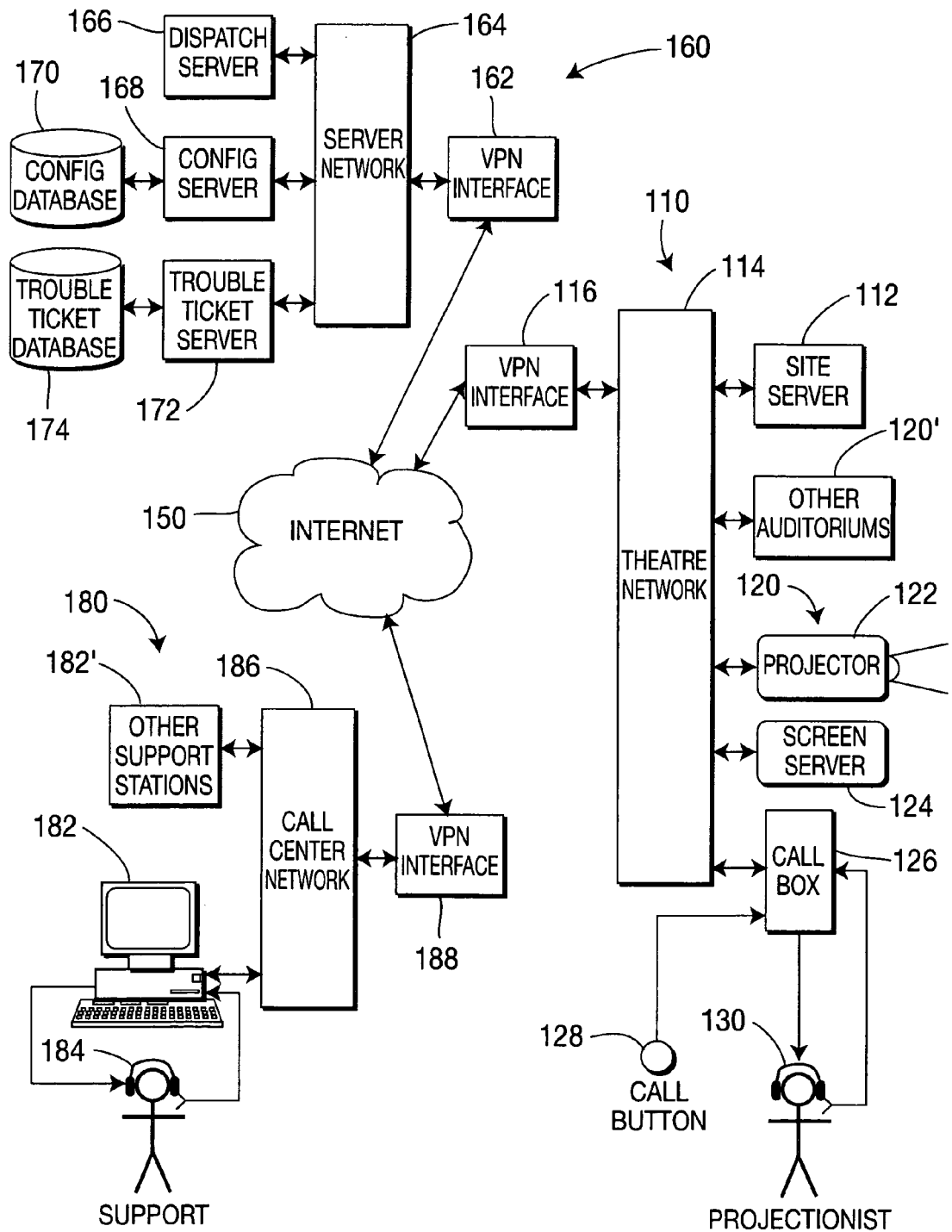
FIG. 1 is a diagram of an exemplary system suitable for implementing the present invention.

Referring now to the drawings, and more particularly to FIG. 1, an exemplary system suitable for implementing the present invention is shown. For purposes of example and explanation, the system of FIG. 1 is shown as a call box system for providing a communication link between a digital cinema theater and a support station. The principles of the present invention may also be applicable to other systems and/or environments. The exemplary system of FIG. 1 comprises a digital cinema theatre 110, one or more networks such as the internet 150, a data center 160 and a call center 180 which will hereinafter be described.

According to an exemplary embodiment, digital cinema theatre 110 may be embodied as a multiplex or other type of theatre and comprises a site server 112, a theatre network 114, a virtual private network (VPN) interface 116 and auditorium equipment 120. Auditorium equipment 120 comprises a digital cinema projector 122, a digital cinema screen management server 124, a call box 126, a call button 128 and a headset 130. Additional auditoriums 120' having the same or similar elements as auditorium equipment 120 may also be provided.

According to an exemplary embodiment, site server 112 is operative to monitor the current status of auditorium equipment 120 using, for example, a simple network management protocol (SNMP), or a monitoring application, such as the Technicolor Theatre Management System (TMS) product. Theatre network 114 is operative to connect various elements of theatre 110 and may comprise separate media and management networks. VPN interface 116 is operative to provide secure connectivity between theatre 110 and remote locations/sites. Although not expressly shown in FIG. 1, VPN interface 116 preferably includes a firewall that prevents access to theatre network 114 from an exhibitor network co-located in the theatre facility.

According to an exemplary embodiment, digital cinema projector 122 is operative to project visual images onto a screen (not shown). Digital cinema screen management server 124 is operative to play the media for digital cinema projector 122. Although not expressly shown in FIG. 1, other elements such as automation systems, audio systems, closed caption systems, external on-screen ad servers, separate on-screen ad projectors, and/or other elements may also be interconnected on theatre network 114 along with digital cinema projector 122 and digital cinema screen management server 124.

According to an exemplary embodiment, call box 126 is operative to automatically provide a communication link between a projectionist and support personnel at a support center such as call center 180 on the same internet protocol (IP) link associated with auditorium equipment 120 in response to the projectionist activating call button 128. Once the communication link is established, the projectionist may use headset 130 to communicate with the support personnel and resolve one or more problems. Headset 130 includes earphones and microphone, and could include a built-in speaker and microphone (e.g., intercom box). Headset 130 may also include a wireless link that associates with the nearest call box 126. In this manner, the headset association could be made when call button 128 is pressed. Alternatively, call button 128 could be located on headset 130. According to an alternative embodiment, another call box (not shown) may be associated with site server 112, or with a manager's office (not shown), rather than an individual auditorium 120/120'.

By automatically providing a communication link between a projectionist and support personnel in the aforementioned manner, the present invention avoids problems associated with the conventional approach to establishing a voice communication link between the projectionist and a support center which requires that the projectionist place a telephone call via a land line or cell phone. As previously indicated herein, this conventional approach suffers the disadvantage that the projectionist must know the number of the support center or look it up, wasting valuable time in the event of an outage. The present invention overcomes the aforementioned difficulties by establishing a voice channel, typically a Voice over Internet Protocol (VoIP) on an IP address associated with auditorium equipment 120. In this manner, in the event of a need to communicate with a support center, the projectionist, or other theater personnel will simply activate call button 128, such is as by picking up a handset or the like. Activating call button 128 immediately establishes the voice channel with the support center with no need to dial a particular number. Moreover, the IP address is associated with auditorium equipment 120 and can used to reference an equipment configuration database to provide details of the current theatre or auditorium configuration. Further exemplary details regarding call box 126 will provided later herein with reference to FIG. 2.

According to an exemplary embodiment, and as shown in FIG. 1, theatre 110, data center 160 and call center 180 are connected via the internet 150. According to an alternative embodiment, internet 150 could be substituted by another network such as a telephone network. With this alternative embodiment, the VPN interfaces shown in FIG. 1 may be replaced by other interface devices such as modems.

According to an exemplary embodiment, data center 160 comprises a VPN interface 162, a server network 164, a dispatch server 166, a configuration server 168, a configuration database 170, a trouble ticket server 172 and a trouble ticket database 174. The foregoing elements of data center 160 may be located at a centralized location, or may be distributed. VPN interface 162 is operative to provide secure connectivity to remote locations/sites. Server network 164 is operative to connect VPN interface 162 to other elements of data center 160. Dispatch server 166 is operative to keep track of which support personnel are available, busy, etc. Dispatch server 166 may also manage a queue and route calls from theatres to the next available or most appropriate support personnel. Configuration server 168 is operative to provide information regarding what equipment should be available at each theatre and auditorium, and its expected configuration. Alternatively, this data could come from site server 112 of the particular theatre 110. Configuration database 170 is operative to store the aforementioned data provided by configuration server 168. Trouble ticket server 172 is operative to track open and resolved issues (e.g., relating to undesirable operating conditions) for theatres and auditoriums. Trouble ticket database 174 is operative to store data for trouble ticket server 172.

According to an exemplary embodiment, call center 180 comprises one or more support stations 182/182', a headset 184, a call center network 186 and a VPN interface 188. Support station 182 is operative to receive and display information from other locations including data center 160 related to the operating conditions of auditoriums and theatres. Support station 182 may for example be implemented as a personal computer (PC), and may also be coupled with a telephone if VoIP is not used. In this latter case, information from other locations such as configuration database 170 and trouble ticket database 174 of data center 160 may still be displayed at support station 182, but voice communication with support personnel may be conducted over a telephone (e.g., POTS) network or a PBX network at call center 180. In such a case, a VoIP-to-POTS bridge (not shown) may be employed. Support station 182 includes a headset 184 with earphones (same as or similar to headset 130), and may also include a speaker and microphone and have a wireless connection. As indicated in FIG. 1, call center 180 may include multiple support stations 182' having the same or similar configuration as support station 182. Call center network 186 is operative to connect elements of call center 180 to VPN interface 188. Alternatively, call center network 186 may be contiguous with server network 164 of data center 160. VPN interface 188 is operative to provide secure connectivity to remote locations/sites, and is how call center 180 communicates with server network 164 of data center 160 and theatre network 116 of theatre 110. According to principles of the present invention, VPN interface 188 is operative to provide a communication link between call box 126 of theatre 110 and support station 182 of call center 182 in response to user activation of call button 128. When this occurs, support station 182 automatically receives identification information associated with theatre 110 via the communication link. This identification information enables support personnel at support station 182 to obtain information relating to the operating conditions of equipment at a given auditorium of theatre 110 from configuration database 170 and trouble ticket database 174 of data center 160.

Figure 2:
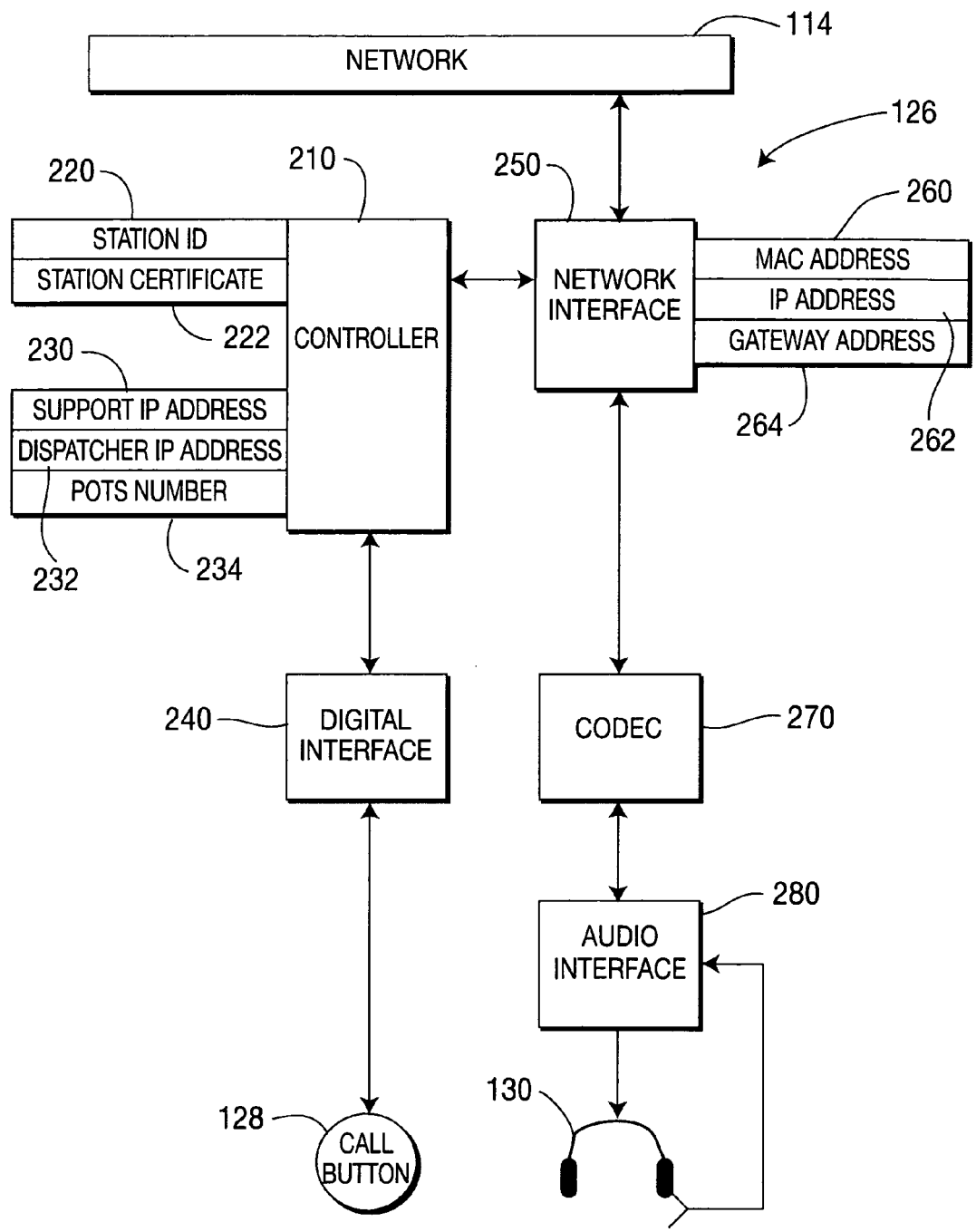
FIG. 2 is a diagram providing additional details related to the call box of FIG. 1 according to an exemplary embodiment of the present invention.

Referring now to FIG. 2, a diagram providing additional details related to call box 126 of FIG. 1 according to an exemplary embodiment of the present invention is shown. As indicated in FIG. 2, call box 126 comprises call button 128 and headset 130 (as previously described above in conjunction with FIG. 1), and further comprises a controller 210, a digital interface 240, a network interface 250, a CODEC 270 and an audio interface 280.

According to an exemplary embodiment, controller 210 includes an associated memory for storing a station ID 220 and a station certificate 222. Station ID 220 is essentially a serial number associated with call box 126 and station certificate 222 is used to enable public/private key encrypted data exchanges. Station ID 220 and/or station certificate 222 may be used alone, or in: concert with another identifier for call box 126 (e.g., an ID for site server 112 or VPN interface 116—see FIG. 1) to determine the particular auditorium in which call box 126 is located. Alternatively, call box 126 may be programmed with a site/auditorium ID (i.e., a form of station ID 220). These identifications allow the lookup of information in configuration database 170 of data center 160 (see FIG. 1) related to the operating conditions of equipment included in the particular auditorium in which call box 126 is located.

Digital interface 240 reads inputs from call button 128 and provides corresponding outputs to controller 210 for processing. Network interface 250 connects call box 126 to theatre network 114 and accepts commands from controller 210 which are provided to dispatch server 166 or support station 182. According to an exemplary embodiment, network interface 250 initiates a communication link under the control of controller 210 between call box 126 and another location such as dispatch server 166 or support station 182 in response to user activation of call button 128. Between controller 210 and network interface 250, at least one of the following identifications is provided: media access control (MAC) address 260, IP address 262 and gateway address 264.

According to principles of the present invention, controller 210 causes an identification associated with call box 126 (e.g., MAC address 260, IP address 262 and/or gateway address 264) to be automatically provided to another location such as dispatch server 166 or support station 182 via the aforementioned communication link in response to user activation of call button 128. This identification enables the other location to obtain information relating to the operating conditions (including undesirable operating conditions) of equipment included in the particular auditorium in which call box 126 is located. CODEC 270 is operative to convert audio content into VoIP packets and send them to another location via network interface 250 and theatre network 114, and to accept inbound VoIP packets and convert them to audio content. Audio interface 280 is operative to perform analog-to-digital and digital-to-analog conversions of audio content, and may have a wired and/or wireless connection to headset 130.

Figure 3:
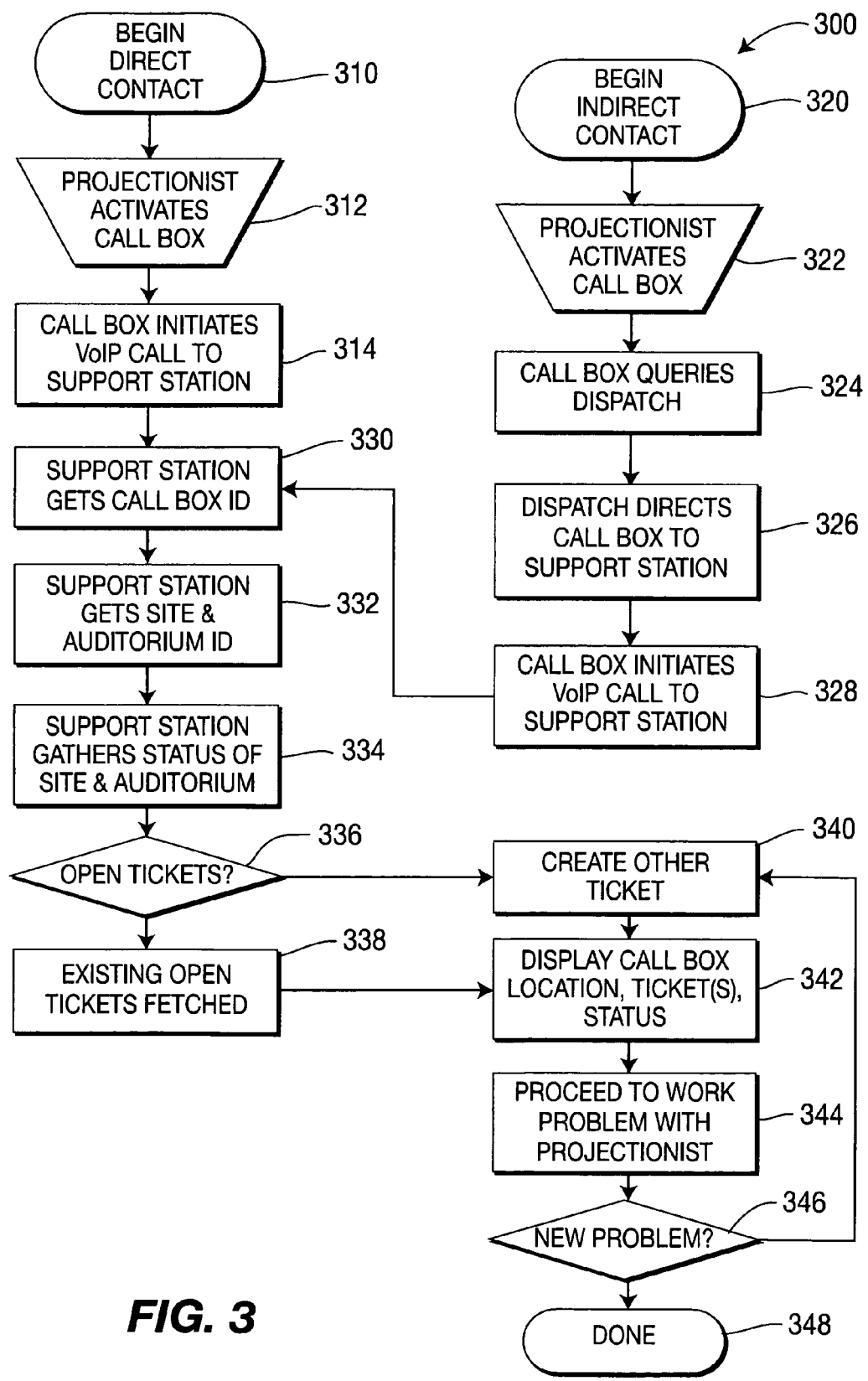
FIG. 3 is a flowchart illustrating a method for using a call box according to an exemplary embodiment of the present invention.

Referring to FIG. 3, a flowchart 300 illustrating a method for using a call box according to an exemplary embodiment of the present invention is shown. For purposes of example and explanation, the steps of FIG. 3 will be described with reference to the call box system of FIG. 1 and call box 126 of FIG. 2. The steps of FIG. 3 are exemplary only, and are not intended to limit the present invention in any manner.

At step 310, a process for establishing direct contact between call box 126 and support station 182 begins. At step 312, a projectionist activates call box 126. According to an exemplary embodiment, the projectionist activates call box 126 at step 312 by activating call button 128, which does not include dialing a particular number. Call button 128 may be a switch hook of a telephone. Accordingly, the projectionist may activate call button 128 at step 312 by simply picking up the handset of a telephone.

At step 314, call box 126 initiates a communication link to support station 182 in response to the activation of call button 128 at step 312 by initiating a voice over internet protocol (VoIP) call to support station 182. According to an exemplary embodiment, the VoIP call may be initiated at step 314 using support IP address 230 or POTS number 234 (see FIG. 2).

As an alternative to establishing direct contact between call box 126 and support station 182, such contact may be established indirectly. According to this alternative, a process for establishing indirect contact between call box 126 and support station 182 may begin at step 320. At step 322, a projectionist activates call box 126 by activating call button 128, in the same manner as performed at step 312.

At step 324, call box 126 queries dispatch server 166 of data center 160 for contact information for support station 182. According to an exemplary embodiment, call box 126 contacts a dispatcher associated with dispatch server 166 using dispatcher IP address 232 or POTS number 234 (see FIG. 2) at step 324. This allows the projectionist to interact with the dispatcher. As a result of this interaction, call box 126 is directed to support station 182 at step 326. At step 328, call box 126 initiates a communication link to support station 182 by initiating a VoIP call to support station 182 in the same manner as performed at step 314.

It is noted that either of the aforementioned paths of FIG. 3 (i.e., direct contact via steps 310-314 or indirect contact via steps 320-328) may include being forwarded to another support station (not shown). That is, support station 182 or dispatch server 166 may forward the call to another support station 182' or another call center (not shown).

At step 330, support station 182 receives an identification associated with call box 126. According to an exemplary embodiment, the identification may include at least one of station ID 220, station certificate 222, MAC address 260, IP address 262 and gateway address 262 (see FIG. 2).

At step 332, support station 182 can access configuration database 170 to get information about auditorium equipment 120 and theatre 110, which are both associated with call box 126. Preferably, other databases are accessed (e.g., logistics databases, such as those tracking theatre bookings, content shipments, transportation logs, delivery records, key distributions, satellite transmission records, status, and schedules, etc.). Records appropriate to theatre 110 and/or auditorium equipment 120 are sought, especially those representing a recent event (e.g., a delivery, etc.) or open status (e.g., content in transit, etc.).

At step 334, support station 182 gathers and displays status information about auditorium equipment 120 and theatre 110, preferably from site server 112, but alternatively from screen server 124, projector 122, and other auditorium equipment 120 (not shown). Preferably, this represents the creation of a connection to site server 112 or auditorium equipment 120 that persists throughout the call, so that the current status of auditorium equipment 120 is constantly or periodically provided.

At step 336, support station 182 accesses trouble ticket database 174 to determine if any open tickets are found. If any existing, open tickets are found, they are fetched and presented at step 338. If no open tickets are found, a new ticket is created at step 340.

At step 342, the status collected at step 334 (or updated from a persistent or periodic connection) and open trouble tickets, are displayed to support personnel. This enables support personnel to have a complete view of the situation, from the equipment, logistics, and open issues points of view. Support station 182 may also present a graphical user interface (GUI) or command line interface to allow support personnel to control one or more pieces of auditorium equipment 120. For example, a remote keyboard, video and/or mouse interface (not shown) may provide support station 182 with the ability to interact directly with site server 112 or screen server 124, as if the support personnel was in actually present at the auditorium.

At step 344, the projectionist and support personnel work to solve the problem(s). During this process, notes may be added to the open trouble ticket, and the logistics situation can be reviewed (e.g., content at issue was delivered 6 hours ago, encryption keys are awaiting retrieval, etc.). Also, the operating status of auditorium equipment 120 may be monitored by the support personnel, software can be updated or executed, and support personnel can log onto affected auditorium equipment 120, run diagnostic software, and/or take control of affected auditorium equipment 120.

At step 346, if a new problem is identified, a new ticket can be generated at step 340. Otherwise, the current tickets are either closed or left open to be addressed later. At step 348, use of call box 126 is complete and the call (i.e., communication link) is terminated.

As described herein, the present invention provides a method and apparatus for providing a communication link between a first location such as a digital cinema theater and a second location such as a support station. While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method comprising:
   automatically establishing a communication link between a first location and a second location in response to a first activation from a first device at the first location, wherein said first activation does not include dialing a number;
   automatically providing an identification associated with said first device to said second location via said communication link; and
   obtaining information relating to at least a current operating status of one or more other devices networked to the first device at the first location, wherein said information is obtained based at least in part on the identification of the first device;
   wherein said communication link includes a voice over Internet protocol link.

2. The method of claim 1, wherein said first location is a digital cinema theatre and said second location is a support station.

3. The method of claim 1, wherein said communication link is automatically established in response to a user activating a call button associated with an auditorium included in a digital cinema theatre.

4. The method of claim 1, wherein said identification includes at least one of a station identification, a station certificate, a media access control address, an Internet protocol address and a gateway address.

5. An apparatus comprising:
   means for automatically establishing a communication link between a first location and a second location in response to a first activation from a first device at the first location, wherein said first activation does not include dialing a number;
   means for automatically providing an identification associated with said first device to said second location via said communication link; and
   means for obtaining information relating to at least a current operating status of one or more other devices networked to the first device at the first location, wherein said information is obtained based at least in part on the identification of the first device.

6. The apparatus of claim 5, wherein said first location is a digital cinema theatre and said second location is a support station.

7. The apparatus of claim 5, wherein said communication link is automatically established in response to a user activating a call button associated with an auditorium included in a digital cinema theatre.

8. The apparatus of claim 5, wherein said identification includes at least one of a station identification, a station certificate, a media access control address, an Internet protocol address and a gateway address.

9. The apparatus of claim 5, wherein said communication link includes a voice over Internet protocol link.

10. An apparatus comprising:
    an interface operative to automatically establish a communication link between a first location and a second location in response to a first activation from a first device at the first location, wherein said first activation does not include dialing a number;
    a controller operative to automatically provide an identification associated with said first device to said second location via said communication link; and
    said controller is also operative to obtain information relating to at least a current operating status of one or more other devices networked to the first device at the first location, wherein said information is obtained based at least in part on the identification of the first device;
    wherein said communication link includes a voice over Internet protocol link.

11. The apparatus of claim 10, wherein said first location is a digital cinema theatre and said second location is a support station.

12. The apparatus of claim 10, wherein said communication link is automatically established in response to a user activating a call button associated with an auditorium included in a digital cinema theatre.

13. The apparatus of claim 10, wherein said identification includes at least one of a station identification, a station certificate, a media access control address, an Internet protocol address and a gateway address.

14. A method comprising:
    automatically providing a communication link between a first location and a second location in response to a first activation from a first device at said first location, wherein said first activation does not include dialing a number;
    automatically receiving an identification associated with said first device at said second location via said communication link; and
    obtaining information relating to at least a current operating status of one or more other devices networked to the first device at the first location, wherein said information is obtained based at least in part on the identification of the first device;
    wherein said communication link includes a voice over Internet protocol link.

15. The method of claim 14, wherein said first location is a digital cinema theatre and said second location is a support station.

16. The method of claim 14, wherein said communication link is provided in response to a user activating a call button associated with an auditorium included in a digital cinema theatre.

17. The method of claim 14, wherein said identification includes at least one of a station identification, a station certificate, a media access control address, an Internet protocol address and a gateway address.

18. An apparatus comprising:
means for automatically providing a communication link between a first location and a second location in response to a first activation from a first device at said first location, wherein said first activation does not include dialing a number;
means for automatically receiving an identification associated with said first device at said second location via said communication link; and
means for obtaining information relating to at least a current operating status of one or more other devices networked to the first device at the first location, wherein the information is obtained based at least in part on the identification of the first device.

19. The apparatus of claim 18, wherein said first location is a digital cinema theatre and said second location is a support station.

20. The apparatus of claim 18, wherein said communication link is provided in response to a user activating a call button associated with an auditorium included in a digital cinema theatre.

21. The apparatus of claim 18, wherein said identification includes at least one of a station identification, a station certificate, a media access control address, an internet protocol address and a gateway address.

22. The apparatus of claim 18, wherein said communication link includes a voice over Internet protocol link.

23. An apparatus comprising:
an interface operative to automatically provide a communication link between a first location and a second location in response to a first activation from a first device at said first location, wherein said first activation does not include dialing a number;
a support station operative to automatically receive an identification associated with said first device at said second location via said communication link; and
said support station is also operative to obtain information relating to at least a current operating status of one or more other devices networked to the first device at the first location, wherein said information is obtained based at least in part on the identification of the first device;
wherein said communication link includes a voice over Internet protocol link.

24. The apparatus of claim 23, wherein said first location is a digital cinema theatre and said second location is a support station.

25. The apparatus of claim 23, wherein said communication link is provided in response to a user activating a call button associated with an auditorium included in a digital cinema theatre.

26. The apparatus of claim 23, wherein said identification includes at least one of a station identification, a station certificate, a media access control address, an Internet protocol address and a gateway address.

* * * * *